INVENTOR
M. A. LOGAN
ATTORNEY

June 15, 1943.  M. A. LOGAN  2,321,758
TELEPHONE SYSTEM
Filed Sept. 26, 1941   10 Sheets-Sheet 3
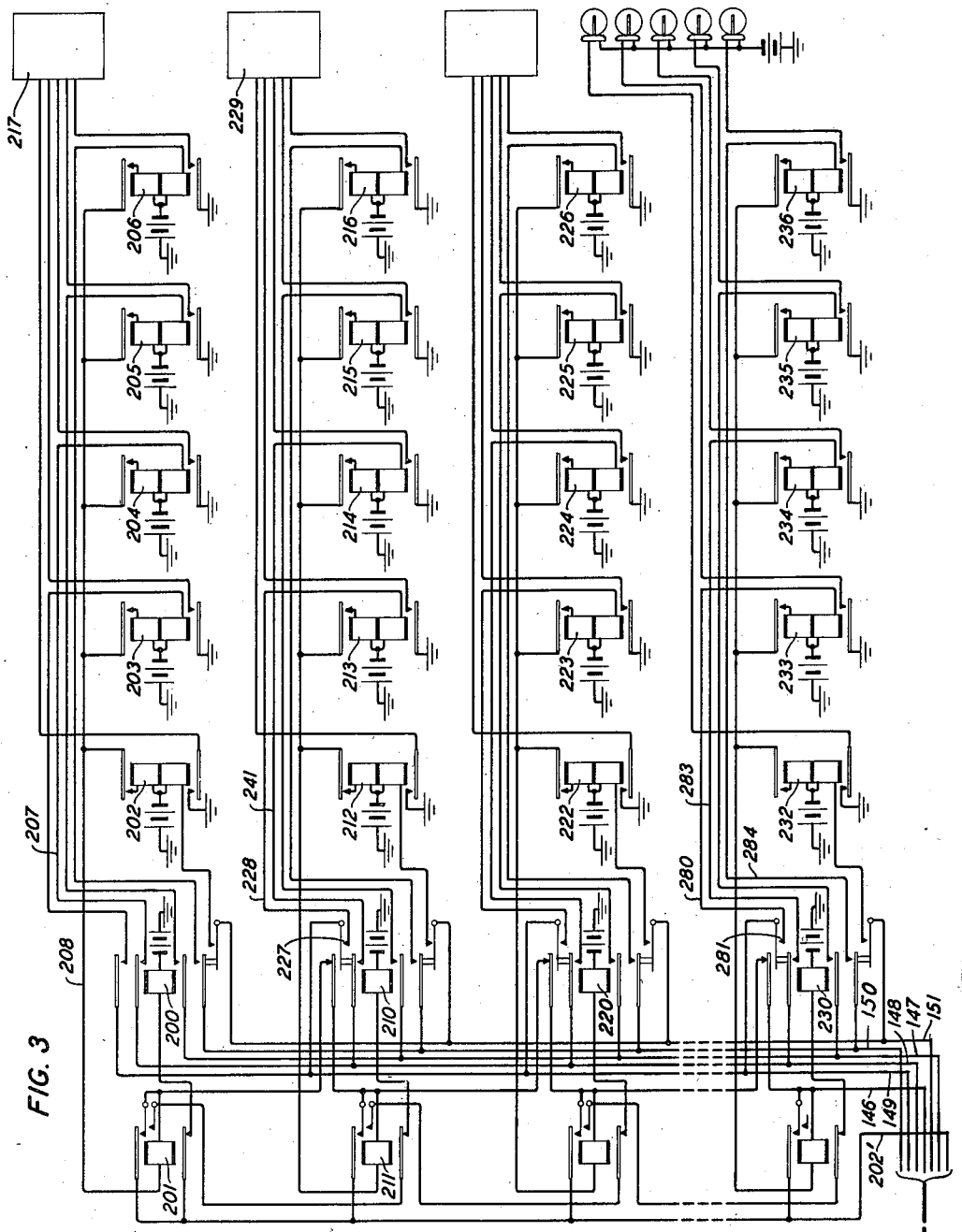
FIG. 3
INVENTOR
M. A. LOGAN
BY 
ATTORNEY

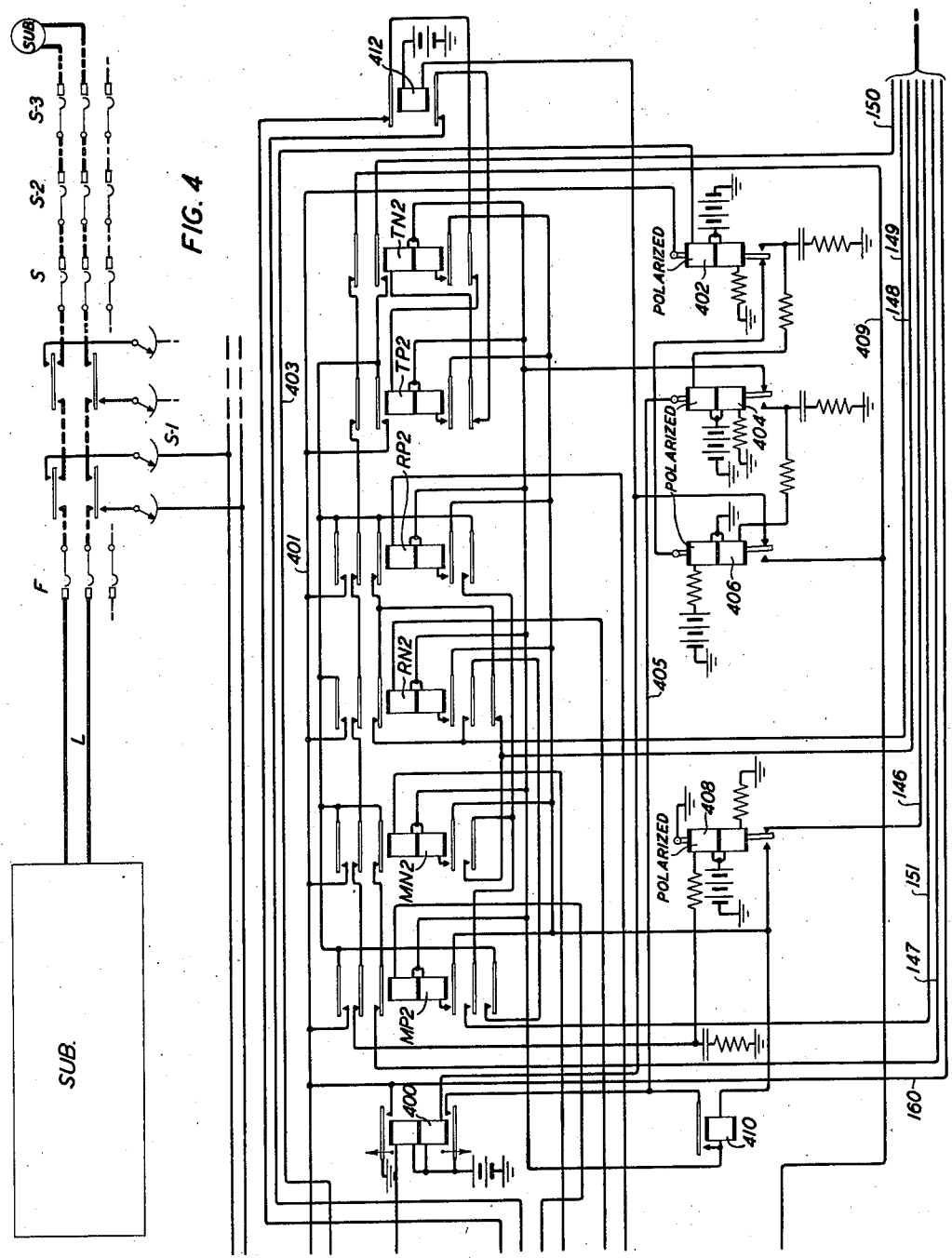

FIG. 6

| DIGIT | KEY | CODE RELAYS | TRANSLATOR RELAYS | REGISTER RELAYS | | | |
|---|---|---|---|---|---|---|---|
| | | | | 1ST. DIGIT | 2ND. DIGIT | 3RD. DIGIT | LAST DIGIT |
| 1 | e | TP MP RN | TP2 MP2 RN2 | 203 | 213 | 223 | 233 |
| ABC 2 | c | TP MN RP | TP2 MN2 RP2 | 204 | 214 | 224 | 234 |
| DEF 3 | k | TP MP | TP2 MP2 | 203 204 | 213 214 | 223 224 | 233 234 |
| GHI 4 | g | TP RP | TP2 RP2 | 205 | 215 | 225 | 235 |
| JKL 5 | b | TN MN RN | TN2 MN2 RN2 | 206 | 216 | 226 | 236 |
| MNO 6 | d | TN MP RN | TN2 MP2 RN2 | 203 206 | 213 216 | 223 226 | 233 236 |
| PRS 7 | f | TN MN RP | TN2 MN2 RP2 | 204 206 | 214 216 | 224 226 | 234 236 |
| TUV 8 | m | TN MN | TN2 MN2 | 203 204 206 | 213 214 216 | 223 224 226 | 233 234 236 |
| WXY 9 | h | TN RN | TN2 RN2 | 205 206 | 215 216 | 225 226 | 235 236 |
| Z-OPERATOR-O | a | TP MP RP | TP2 MP2 RP2 | 202 | 212 | 222 | 232 |

June 15, 1943.   M. A. LOGAN   2,321,758
TELEPHONE SYSTEM
Filed Sept. 26, 1941   10 Sheets-Sheet 8

| TELEPHONE DIGIT | KEY | CODE RELAYS | | | TRANSLATOR RELAYS | | | REGISTER RELAYS | | | |
|---|---|---|---|---|---|---|---|---|---|---|---|
| | | | | | | | | 1ST. DIGIT | 2ND. DIGIT | 3RD. DIGIT | LAST DIGIT |
| 1 | k | NP | GP | SN | NP2 | GP2 | SN2 | 203 | 213 | 223 | 233 |
| ABC2 | n | NN | SP | GP | NN2 | SP2 | GP2 | 204 | 214 | 224 | 234 |
| DEF3 | a | NP | GP | | NP2 | GP2 | | 203 204 | 213 214 | 223 224 | 233 234 |
| GHI4 | c | SP | GP | | SP2 | GP2 | | 205 | 215 | 225 | 235 |
| JKL5 | h | NN | SN | GN | NN2 | SN2 | GN2 | 206 | 216 | 226 | 236 |
| MNO6 | p | SN | GN | NP | SN2 | GN2 | NP2 | 203 206 | 213 216 | 223 226 | 233 236 |
| PRS7 | m | NN | GN | SP | NN2 | GN2 | SP2 | 204 206 | 214 216 | 224 226 | 234 236 |
| TUV8 | b | NN | GN | | NN2 | GN2 | | 203 204 206 | 213 214 216 | 223 224 226 | 233 234 236 |
| WXY9 | d | SN | GN | | SN2 | GN2 | | 205 206 | 215 216 | 225 226 | 235 236 |
| Z-OPERATOR-0 | g | NP | SP | GP | NP2 | SP2 | GP2 | 202 | 212 | 222 | 232 |

INVENTOR
M.A.LOGAN

ATTORNEY

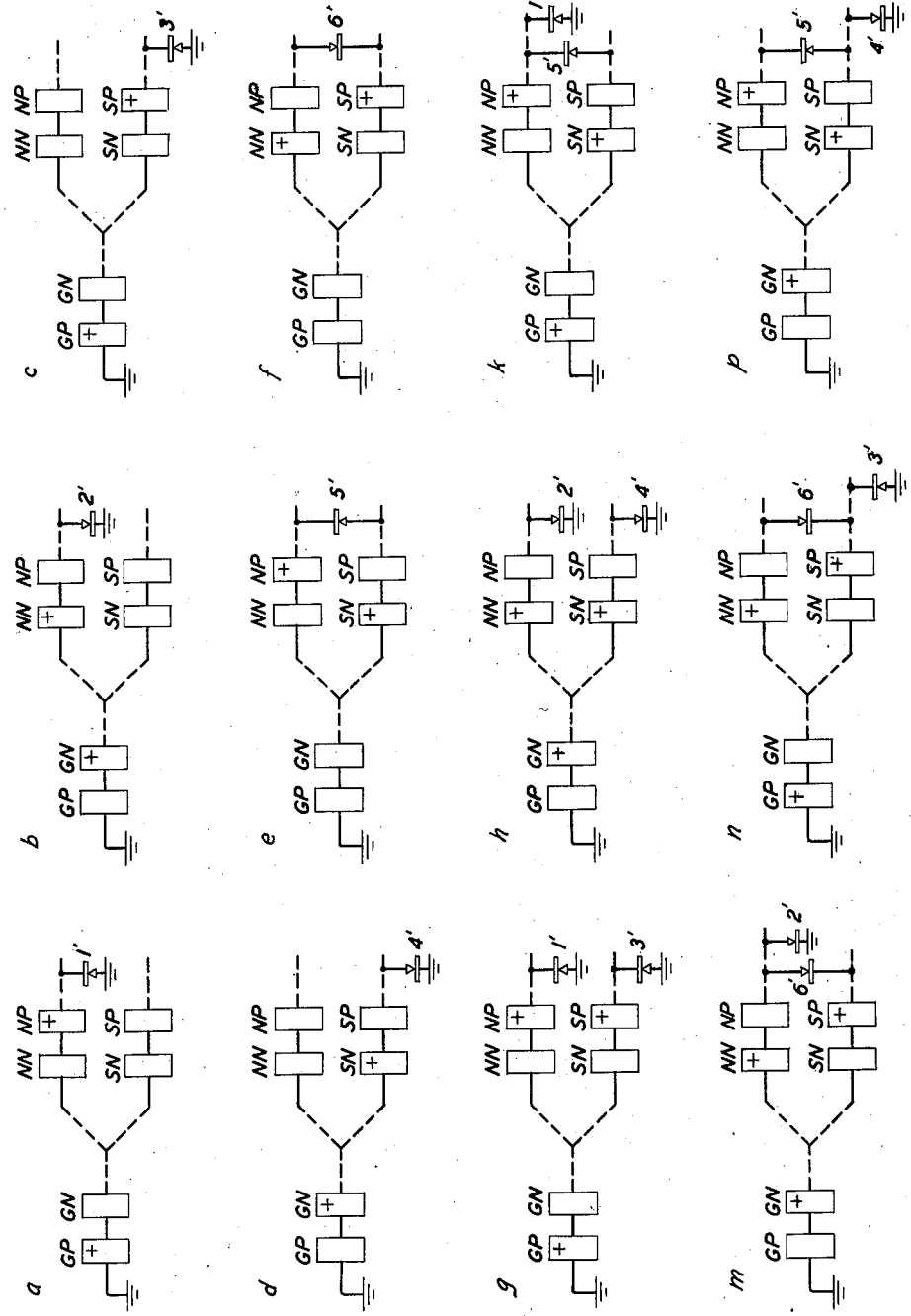

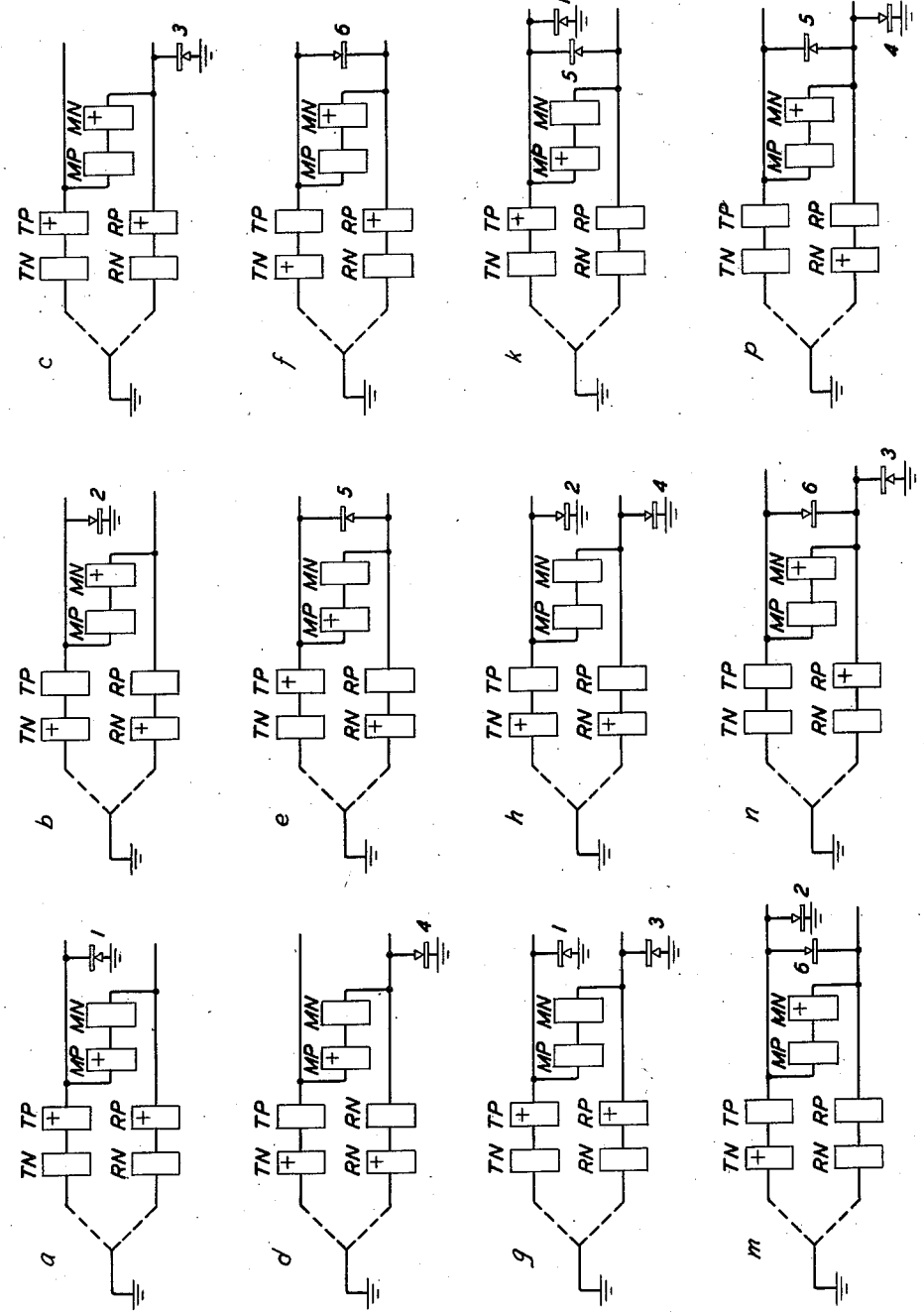
FIG. II

Patented June 15, 1943

2,321,758

UNITED STATES PATENT OFFICE 2,321,758

TELEPHONE SYSTEM

Mason A. Logan, Summit, N. J., assignor to Bell Telephone Laboratories, Incorporated, New York, N. Y., a corporation of New York Application September 26, 1941, Serial No. 412,402

21 Claims. (Cl. 179—18)

This invention relates to signaling and communication systems and particularly to telephone systems in which automatic switches are used in the establishing of telephone connections.

The object of the invention is to provide an improved system of signaling and particularly an improved system of telephone designation transmission, in which the acts necessary on the part of subscribers and operators in transmitting and in recording signals, such as are used to characterize telephone designations are simplified, and whereby the efficiency and speed of operation of the equipment involved are improved and increased, respectively.

Systems have been proposed heretofore, in which the designations of telephone lines or trunk circuits are transmitted from one point to another by means of direct current impulses of different polarities in a time sequence, the polarities, singly and in combinations serving to characterize the different numerals or symbols of the designation. In such systems gas-filled tubes, or the equivalent, are employed at the sending point and are connected in various combinations to the line over which the designations are to be transmitted to cause rectified impulses of different polarities to traverse the line and to selectively control the operation of translating devices at the receiving point. Such direct current impulse signaling systems are restricted to eight unique codes. To obtain the ten codes required in telephone designation transmitting systems, a time sequence per digit has been used or a marginal condition has been employed, requiring a double test by the central office equipment.

According to the present invention, advantages are secured over such prior systems in the utilization of a three-phase alternating current source at the receiving point and a three-phase transformer for connecting this source to the two line wires of a telephone line; by including in each leg of the three-phase transformer termination of the line a pair of polarized code relays which selectively respond to positive and negative impulses transmitted over the line; and by the provision of switching means at the sending point for selectively connecting oppositely poled varistors, singly and in combinations between the two line wires, or between either or both of the line wires and ground to effect the selective transmission of positive and/or negative impulses over the line in such a manner as to selectively operate the polarized relays simultaneously in various combinations, which characterize the various symbols of a telephone designation. Such a system obtains the necessary ten codes with a single impulse combination, using neither marginal nor time tests.

Another feature of the invention resides in the provision of translating means at the receiving point which is capable of translating the impulses received by the polarized code relays into pulses recognizable by a sender or register of the type commonly employed in pulsing systems involving the conventional dial.

A further feature of the invention resides in the use of means in the translating device at the receiving point which functions in such a manner as to relieve the transmitting operator or subscriber of any requirements as to the manner in which the switching means at the sending point is actuated, thus insuring the correct operation of the system regardless of whether or not the switching means is actuated at all times to uniformly transmit impulses of the same duration.

Another feature of the invention resides in the provision of means for precluding the possibility of false operation of the system on starting or sending transients which may occur at the beginning and ending of the actuation of the designation sender and thus cause false operation of the code relays. This feature is attained by means of a timing circuit which controls the connection of the armature contacts of the code relays to the windings of the corresponding relays in the translator circuit and which functions, first, to delay this connection for a short interval of time and second, to serve as a means for disassociating the code relays from the translator circuit as soon as the translator relays have operated. Thus, the association of the code relays with the translator circuit is of a momentary nature which prevents any false operation of the translator relays due to either a starting or an ending transient, since these relays are not connected to the contacts of the code relays when either of these events occur.

These and other features of the invention will be described more fully in the following specification and will also be set forth in the appended claims.

The drawings illustrate two embodiments of the invention, one involving a delta-connected termination for the line and the other involving a Y-connected termination. Figs. 1, 2 and 3 when combined in the manner indicated in Fig. 5 constitute a complete system of signaling which involves the delta-connected line termination, while Figs. 7, 8 and 3 when combined, as indicated in Fig. 5 constitute a complete system of signaling which involves the Y-connected line termination.

In the drawings:

Fig. 3 shows a decoder register circuit and associated apparatus which is controlled by the operation of the translator circuit to record and register the designations transmitted from the calling station;

Fig. 4 is an alternative form of translator circuit which may be substituted for the translator circuit shown in Fig. 1;

Fig. 5 is a block diagram illustrating the manner in which the drawings are to be assembled to effect the two complete systems disclosed;

Fig. 6 is a table which indicates the code, translator and register relay combinations which result from the actuation of each of the keys of the keying device or sender K at substation A;

Figure 9:
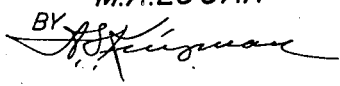

Fig. 9 is a table similar to that shown in Fig. 6 and indicates the code, translator and register relay combinations which result from the actuation of each key of the key sender K'; and Figs. 10 and 11 are schematic illustrations which show the manner in which the several varistors are associated with the cable conductors for each key of the key type senders and indicate the code relays which respond to each key actuation. Fig. 10 is applicable to the system involving the Y-termination and Fig. 11 applies to the system involving the delta-termination.

Before entering into a detailed description of the operation of the system involving Figs. 1, 2, 3, 6 and 11 of the drawings, a brief reference will be made to the more important elements involved in the circuits.

Figure 1:
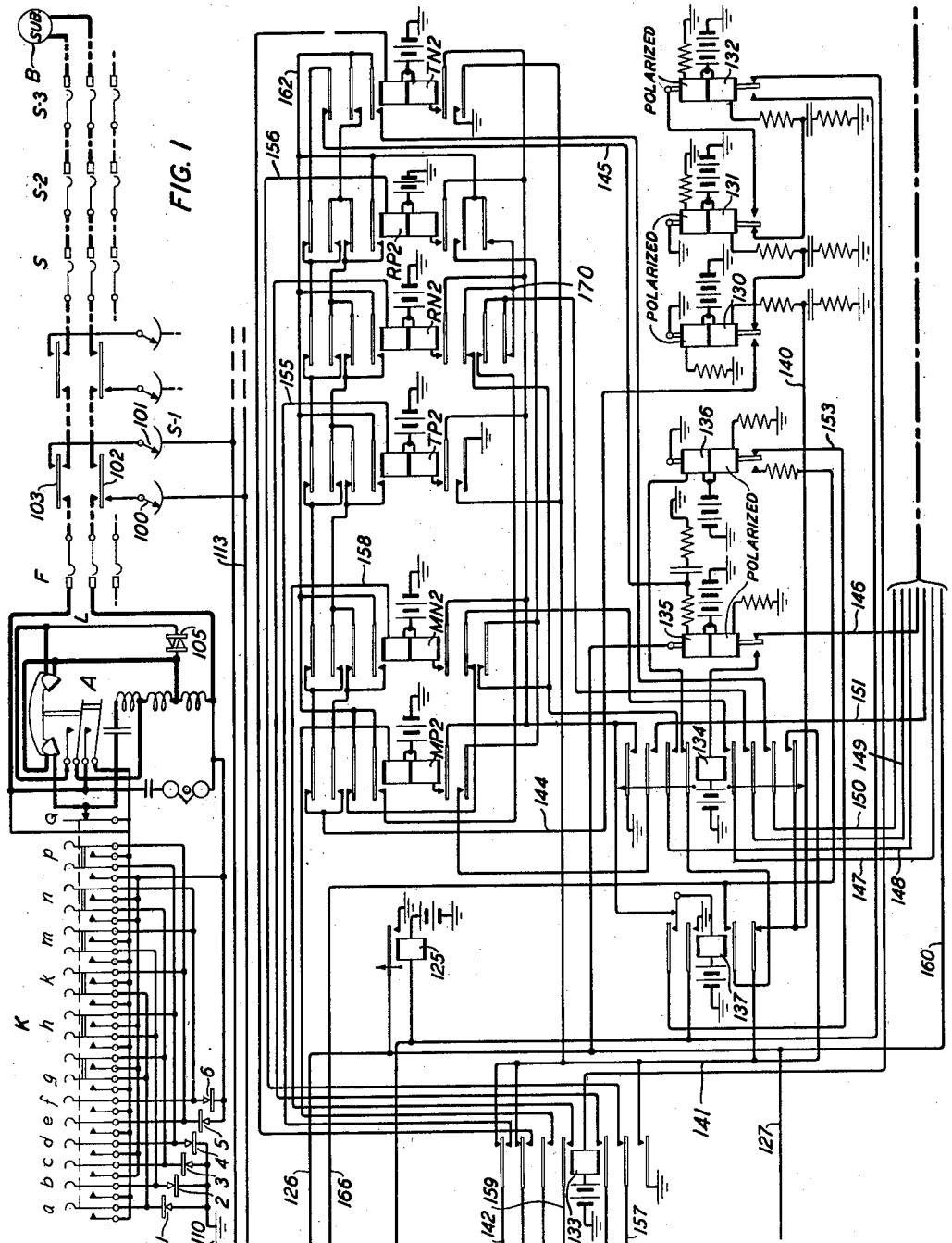
Fig. 1 shows diagrammatically, the automatic switches over which a call originated at a calling station A may be extended to a called station B, and also illustrates the key type sender K at the calling station, and a translator circuit which translates the impulses originated at the calling station.

In Fig. 1 there is illustrated a two-wire cable L between the subscriber station and the central office which is connected through the line finder F and selector switch S—1 and terminates in a delta-connected network comprising the secondary windings of a three-phase transformer. The delta-network termination of the cable line comprises three electrically balanced legs M, T and R. The leg M is connected through the switches across the tip and ring conductors of the cable L; the leg T is connected between the tip conductor of cable L and ground; and the leg R is connected between the ring conductor of cable L and ground. Each of the legs M, T and R contains two polar relays designated MN and MP, TN and TP and RN and RP, respectively, the relays MP, TP and RP operating when a direct current component of positive polarity flows through their windings, and relays MN, TN and TP operating when a direct current component of negative polarity flows through their windings. The definition of "positive" current in each leg is arbitrary. The directions assumed as positive are indicated in the drawings by arrows. Each branch of the delta-connection also includes two elimination filters, one tuned to 60 cycles and the other to 120 cycles, to prevent the relay contacts from following these current components. These filters are designated FM1, FM2, FR1, FR2, FT1 and FT2. Each branch of the delta-connection also includes a current limiting resistance such as RM, RT and RR.

The branch of the delta which includes the transformer T1 supplies voltage to the metallic circuit of the cable L extending through the automatic switches at the central office. The branches of the delta which include the transformers T2 and T3 supply voltage from the tip side of the cable L to ground and from the ring side of the cable L to ground respectively.

A source of 60 cycle, three-phase power is indicated at P. This source is connected to three variacs or adjustable autotransformers VM, VT and VR, which are arranged in a Y-connection. Obviously, the variacs could be connected in delta if the power supply was delta-connected. The variacs provide a convenient method of varying the voltage and of correcting for any inequality between the phase voltages. The output leads from the variacs VM, VT and VR connect to the primary windings of transformers T1, T2 and T3, respectively, the secondary windings of which, as above indicated, are part of the delta-termination of cable line L and supply signaling current directly thereto. The frequency of the source, obviously, need not be restricted to 60 cycles. The cable line L comprises the calling subscriber's line and is connected to the delta-termination by way of the central office switches when the calling subscriber at a substation, such as substation A, initiates a call.

The direct current impulses which selectively operate the code relays MN, MP, TN, TP, RN and RP are produced by the keyboard sender or switching device K, located at a calling subscriber's station. This device consists of a series of individually operable keys $a$, $b$, $c$, $d$, $e$, $f$, $g$, $h$, $k$, $m$, $n$, and $p$ each of which functions, when actuated, to connect one or more of the varistors 1 to 6, inclusive, to the tip and/or ring conductors of the subscriber's line, or across both line conductors. Rectifier 1 may be connected from the tip conductor of the line to ground and is so poled as to cause positive current to flow over the tip of the line. Rectifier 2 may also be connected from the tip conductor of the line to ground but is so poled as to cause negative current to flow over the tip conductor of the line. Rectifiers 3 and 4 correspond to rectifiers 1 and 2, respectively, and may be connected between the ring conductor of the line and ground. Rectifiers 5 and 6 may be connected from the tip conductor of the line to the ring conductor thereof.

It will be evident, on consideration of the circuit disclosed, that when any one of the above-mentioned six rectifiers is connected to the line as indicated, and the calling line with its cable L is connected to the delta-termination direct current flows not only in the branch of the delta which supplies it directly, but also in the other two branches. For example, when rectifier 5 is connected, positive current of a given value flows in the M branch of the delta, operating relay MP, and currents of one-half this value flow in the T and R branches. The current is in a positive direction in the T branch and in a negative direction in the R branch, so that relays TP and RN also will be operated. The current in branches T and R is one-half of the current in the M branch because, while the vector sum of the alternating current voltages across branches T and R equals that across the M branch, the resistance to direct current of the two branches in series is double that of the single branch.

It has just been shown that when rectifier 5 is connected to the line, relays TP, RN and MP will be operated. The relay combinations resulting from the connection of each of the other five rectifiers can be readily worked out. It is found that, in each case, a different combination of relays operates. In Fig. 6, the various relay combinations which result from the actuation of the keys of the designation sender K are indicated.

As hereinbefore indicated, the keyboard K is shown as including twelve keys, though in a telephone designation sender some number less than twelve, and possibly ten will suffice. When key $a$ is operated, rectifier 1 is connected between ground and the tip conductor of the line; when key $b$ is operated, rectifier 2 is connected between ground and the tip conductor; key $c$ connects rectifier 3 between ground and the ring conductor; key $d$ connects rectifier 4 between ground and the ring conductor; key $e$ connects rectifier 5 across the tip and ring conductors; key $f$ connects rectifier 6 across the tip and ring conductors; key $g$ connects rectifier 1 between ground and the tip conductor and rectifier 3 between ground and the ring conductor; key $h$ connects rectifier 2 between ground and the tip conductor and rectifier 4 between ground and the ring conductor; key $k$ connects rectifier 1 between ground and the tip conductor and rectifier 5 across the tip and ring conductors; key $m$ connects rectifier 2 between ground and the tip conductor and rectifier 6 between the tip and ring conductors; key $n$ connects rectifier 3 between ground and the ring conductor and rectifier 6 across the tip and ring conductors of the line; and key $p$ connects rectifier 4 between ground and the ring conductor and rectifier 5 across the tip and ring conductors.

The subscriber's line, upon which station A is located, extends to the central office and appears in a line-finder switch F. This switch serves to extend the calling line through to a first selector S, and a sender selector S—1 serves to extend the calling line to terminate in the delta network hereinbefore discussed. The polarized relays of the delta control the operation of a plurality of multicontact translator relays MP2, MN2, TP2, RN2, RP2 and TN2 included in the translator circuit of Figs. 1 or 4. These relays in turn control the operation of a decoder register circuit such as shown in Fig. 3. The decoder register circuit is shown terminating in a plurality of lamp indicators which record the telephone designations transmitted from the calling station. The register circuit functions to store the designations for use in controlling the selector switches, S, S—2 and S—3 to complete a connection through to a called subscriber's line B.

Having described in some detail the more pertinent elements of the system involving the delta-terminated line, a detailed description will now be made of the operation of the system. For this purpose it will be assumed that the subscriber at station A desires a connection with the subscriber's line terminating at station B, the telephone designation of which, for descriptive purposes, is assumed to be AD4–5678.

It is to be understood that the keyboard K at the calling station A, when used as a telephone designation sender will have each key identified by symbols similar to those which appear on the well-known telephone dial. For example, the key $a$ would bear the numeral "0" corresponding to the tenth hole in the finger wheel of a dial; key $b$ would bear the symbols "5JKL"; key $c$ would bear the smbols "2ABC"; key $d$, the symbols "6MNO"; key $e$, the smbol "1"; key $f$, the symbols "7PRS"; key $g$, the symbols "4GHI"; key $h$, the symbols "9WXY"; key $k$, the symbols "3DEF"; key $m$, the symbols "8TUV"; and keys $n$, and $p$ would bear other symbols, it being understood that only ten keys are used in the transmission of telephone designations. The keys of keyboard K have not been shown in the order in which they would appear in practice, since to do so would unnecessarily complicate the drawing. The keys are shown in an order which lends to a simplification of the drawing.

When the subscriber at station A removes the handset, in accordance with usual practice, to initiate a call, the line circuit is closed, and the finder F is started in operation in the well-known manner to seize the calling subscriber's line. At the same time, the sender selector S—1 becomes effective to extend the calling subscriber's line through to an idle sender. When these operations have been completed, a circuit is closed from the alternating current source P at the central office, through the legs T, R and M of the delta network to the brushes 100 and 101, contact springs 102 and 103 of a controlling sequence switch, thence over the brushes of finder F at the terminals of which the line of station A terminates and through the closed subscriber's line loop at station A. The polarized relays TP, TN, RP, RN, MP and MN do not operate on this alternating current because the filters eliminate this current from the relays.

When a key of the keyboard K is operated at the substation A, and one or more of the rectifiers 1 to 6, inclusive are connected to the line, it is necessary that one of the leads to the subset be disconnected so that there be no low resistance path from tip to ring while the signal, or designation character is being passed. This is accomplished by the off-normal switch Q which opens whenever any key is actuated. Whenever the off-normal switch Q is closed, the subscriber will hear an audible tone in the receiver due to the alternating current voltage being impressed on the line by the source P. A varistor 105 is connected across the receiver at station A to reduce the receiver noise which is caused when the off-normal switch Q opens and closes.

Supervision is maintained with alternating current between the signaling periods. For this purpose supervisory relay 106 is shown in the M branch of the delta. It functions from a full wave copper oxide rectifier X and has a resistance shunt 107 to keep it steadily operated on the pulsating direct current which it receives.

After removing the handset at station A from its cradle support, the subscriber proceeds to actuate the keys of keyboard K in accordance with the desired telephone designation. This designation has been assumed to be AD4–5678 and accordingly, the subscriber actuates keys, c, k, g, b, d, f and m in that order.

With key c actuated, a circuit is established which extends from ground at 110, positive poled rectifier 3, closed contacts of key c, ring conductor of the subscriber's line, corresponding terminals and brushes of switches F and S—1, conductor 113, upper windings of polarized relays RP and RN, resistance 115, impedance coil 116, resistance RR, secondary coil of transformer T3 to ground. As stated hereinbefore, the source P supplies alternating current to each of the primary windings of transformers T3, T2 and T1 by way of the variacs VR, VT and VM, respectively. The positive current traversing the circuit just traced also traverses a circuit extending from the point 117 of the previously traced circuit, through the upper windings of polarized relays MN and MP, resistance 119, impedance coil 120, positively poled rectifiers of X, winding of relay 106 and resistance 107, resistance RM, secondary coil of transformer T1, lower windings of polarized relays TP and TN, resistance 122, impedance coil 123, resistance RT, to ground by way of the secondary winding of transformer T2. Relays TP, RP and MN accordingly, operate in response to the actuation of key c at the substation A. Relays TP and RP operate on the positive impulse, whereas the positive pulse traversing the delta leg M upwardly (viewing Fig. 2) causes the negatively poled relay MN to operate.

It will be noted that when supervisory relay 106 operated, as described above, an obvious circuit was established for the operation of slow-to-release relay 125 (Fig. 1). Relay 125 places ground on the conductors 126 and 127, the former being connected to the armature of relay TP and the latter being connected to the armatures of all relays MP, MN, RP and RN. The multi-contact translator relays of Fig. 1 which correspond to the delta code relays TP, TN, MP, MN, RP and RN are relays TP2 TN2, MP2, MN2, RP2 and RN2, respectively.

Relays 130, 131 and 132 (Fig. 1) constitute a timing circuit which controls the operation and release of relay 133, which functions to momentarily connect the armature contacts of the code relays in the delta network to the translator relays MP2, MN2, TP2, TN2, RN2 and RP2. A slow-to-release relay 135 controls the minimum length of signal delivered to the decoder register relays (Fig. 3) through the contacts of a connector and locking relay 134, while the "end of signal" relay 136 releases a relay 137, whose operation indicates that a signal is being registered. Relay 136 is operated, providing relay 134 is released, when both relays TP and TN are released, indicating that the subscriber is not signaling.

With key c at the substation A operated, and relays TP, RP and MN in the delta network operated, a circuit for the operation of relay 130 is established extending from grounded battery, lower winding of relay 130, conductor 140, back contact and outer lower armature of relay 137, conductor 141, back contact and third upper armature of relay 133, conductor 142, right contact and armature of relay TP, conductor 126, to ground by way of the armature and front contact of relay 125. Relay 130 operated, releases the slow-to-release relay 131 and operates relay 135 in a circuit extending from ground, armature and left contact of relay 130, conductor 144, back contacts and outermost upper armatures of relays MP2, MN2, TP2, RM2, RP2 and TN2, conductor 145, upper winding of relay 135 to grounded battery.

Relay 135 operated, removes ground from the transfer lead 146 to the decoder register circuit and operates relay 134 in an obvious circuit. Relay 134 operated, connects the leads 147, 148, 149, 150 and 151 of the decoder register circuit to the unoperated multicontact translator relays MP2, MN2, TP2, RN2, RP2 and TN2. At its outermost lower armature and front contact, relay 134 provides another operating circuit for relay 130, and at its outermost upper armature and front contact establishes an obvious circuit for relay 137. Relay 137 operates in this circuit and locks to ground at the armature of "end of signal" relay 136 by way of the conductor 153. Relay 134, at its outermost upper armature and front contact also connects ground to the locking contact of each of the translator relays MP2, MN2, TP2, RN2, RP2 and TN2.

While these functions are being performed, slow-to-release relay 131 has not yet released. Furthermore, at the end of any initial transient operation of the code relays in the delta network there may have been a short interval until the proper code relays operated which would remove the operating ground for relay 130. Relay 130 is accordingly made slightly slow-to-release to bridge any gap of this sort and not interrupt the release time of relay 131 or interfere with the operations of relays 135, 134 and 137.

When relay 131 finally drops, it releases the slow-to-release relay 132 and operates relay 133 in an obvious circuit. The operation of relay 133 connects the front contacts of each of the code relays in the delta network to the associated windings of the multicontact translator relays MP2, MN2, TP2, RN2, RP2 and TN2 and also, at its outermost lower armature and front contact replaces a ground on conductor 141 to hold relay 130 operated, which ground had been removed when relay 133 operated its third upper armature.

As previously described, relays TP, RP and MN in the delta network are operated, so that circuits are now established by the operation of relay 133, in which corresponding multicontact translator relays operate.

Translator relay TP2 operates in a circuit extending from grounded battery, upper winding of relay TP2, conductor 155, front contact and third upper armature of relay 133, conductor 142, right contact and armature of relay TP, conductor 126 to ground by way of the armature and front contact of relay 125.

Translator relay RP2 operates in a circuit extending from grounded battery, upper winding of relay RP2, conductor 156, front contact and second upper armature of relay 133, conductor 157, contact and armature of relay RP, conductor 127, to ground by way of the armature and front contact of relay 125.

Translator relay MN2 operates in a circuit extending from grounded battery, upper winding of relay MN2, conductor 158, front contact and innermost lower armature of relay 133, conductor 159, contact and armature of relay MN, conductor 127 to ground by way of the armature and front contact of relay 125.

Relays TP2, RP2 and MN2 operated, lock to ground at the outermost upper armature and front contact of relay 134. These relays also open the operating path of the slow release relay 135. In addition, ground is connected to lead 148 extending to the decoder register circuit (Fig. 3) to operate register relay 204, as will now be described in detail. It will be noted that when relay 125 operated, ground was connected to lead 160 which extends to the decoder register circuit, so that relay 200 is operated in a circuit extending from grounded battery, winding of relay 200, back contact and lower armature of relay 201, conductors 202' and 160 to ground at the armature and contact of relay 125. Relay 200 is operated and connects the leads 147 to 151 inclusive, to the windings of relays 202, 203, 204, 205 and 206, which constitute the first group of register relays.

With translator relays MN2, TP2 and RP2 and relay 200 in the decoder register circuit operated, a circuit is established for the operation of register relay 204. This circuit may be traced from grounded battery, lower winding of register relay 204, conductor 207, front contact and inner upper armature of relay 200, conductor 148, second upper armature and front contact of relay 134, front contact and outermost lower armature of relay MN2, front contact and middle lower armature of relay RP2, lowermost upper armature and front contact of relay TP2, third upper armature and front contact of relay MN2, outermost upper armature and back contact of relay MP2, conductor 144, left contact and armature of relay 130 to ground. Relay 204 operates in this circuit and locks in a circuit extending from grounded battery, upper winding, front contact and upper armature of relay 204, conductor 209, winding of relay 201, back contacts and outer upper armatures of relays 210, 220 and 230, conductor 146, right contact and armature of relay 135, to ground by way of the armature and front contact of relay 125, it being understood that relay 135 is released at this time as will be referred to presently. At its lower armature relay 204 establishes an obvious circuit for the energization of a lamp signal at 217. Thus the character "A" of the telephone designation AD4-5678 is stored in the register for future use in controlling the automatic switches S, S—2 and S—3 which function to extend the call to the called station B.

The release time of relay 135 is made to equal the minimum closure time for grounds applied to the leads 147 to 151 inclusive, plus the maximum difference between the operate times of the translator relays. When relay 135 releases, it places ground on "lock and transfer" lead 146 to lock relay 204 operated as described above. It also releases relay 134, which disconnects the contacts of the multicontact translator relays MP2, MN2, TP2, RN2, RP2 and TN2 from the decoder register and releases relay 130.

The release of relay 130 immediately reoperates relay 131 which, in turn, operates relay 132. The release of relay 134 further partially closes the operate path for the "end of signal" relay 136, so when relays 134, TP or TN (TP in the present case) release, indicating that the subscriber has released the key c, and the digit or character "A" is registered in the sender, relay 136 operates. The operating circuit for relay 136 extends from grounded battery, upper winding of relay 136, back contact and innermost upper armature of relay 134, inner lower armature and front contact of relay 137, conductor 166, left contact and armature of relay TN, left contact and armature of relay TP (now released), conductor 126, to ground at the armature and front contact of slow-to-release relay 125. With relay 136 operated, the locking circuit for relay 137 is opened and relay 137 releases, causing relay 136 to release.

When relay 137 has been released by relay 136 as just described, relay 130 is returned to the control of code relays TP and TN and it will reoperate when either of them operates for the next character of the designation.

When relay 204 in the decoder register operated as described above, its locking circuit was traced through the winding of relay 201, so that relay 201 operated and locked to ground at the armature and contact of relay 125, by way of conductors 160, 202' and the upper armature and first front contact of relay 201. The ground is also transmitted to relay 210, which operates to connect the leads 147 to 151 inclusive to the second group of register relays 212, 213, 214, 215 and 216. At its lower armature relay 201 opens the circuit to relay 200 which relay releases its armatures.

The translator circuit has now been restored to its initial condition and the character "A" has been registered in the decoder register circuit, and the register has been prepared for the reception of the next designation character "D."

The subscriber at station A next actuates key k which, in practice would bear the symbols "3DEF." The operation of key k connects rectifier 1 between ground and the tip of the calling line, and also rectifier 5 across the tip and ring thereof. It will be noted that rectifiers 1 and 5 are similarly poled and in order to clearly indicate, in this instance, how only relays TP and MP in the delta network respond, the following explanation is offered, and in this explanation, it is to be understood that the three legs T, R and M of the delta are balanced. Taking the case of rectifier 5 first, it will be noted that it is connected directly across the tip and ring of the line so that the current traversing the rectifier 5 will divide; ⅔ of it traversing the M leg and ⅓ of it dividing equally between the T and R legs. The direction of the current in leg M is such as to tend to operate relay MP; its direction in leg T is such as to operate relay TP; whereas its direction in leg R is such as to tend to operate relay RN. Now considering rectifier 1, which is connected between ground and the tip of the line, the current traversing this rectifier divides so that ⅔ of it traverses leg T, and ⅓ of it flows in each of the legs R and M. The currents from both rectifiers 5 and 1 are in the same direction in the legs M and T and oppose each other in the leg R, the result being that relays MP and TP receive sufficient current to cause their operation and the current in leg R is zero, so that no relays in the R leg are operated. It follows therefor, that when key k at the substation A is actuated, only relays TP and MP in the delta operate.

Relay MP operated, connects the ground on conductor 127 to the lead 168 and relay TP, as in the previous case, functions to connect the ground on lead 126 to lead 142 and thence to the winding of timing relay 130 by way of the third upper armature and back contact of relay 133, conductor 141, outer lower armature and back contact of relay 137 and conductor 140. It is believed unnecessary to repeat in detail, the operation of the translator circuit as a consequence of the operation of key k at the subscriber's station A. Suffice to say that relay 133 eventually operates to connect the now grounded leads 168 and 142 to the windings of relays MP2 and TP2, respectively, and that these relays operate. Also, relay 134 eventually operates to connect the leads 147 to 151, which extend to the decoder register circuit, to the armatures of relays MP2, MN2, TP2, RN2, RP2 and TN2.

As a result of the operation of code relays MP and TP and the consequent operation of translator relays MP2 and TP2, a circuit is completed which extends from ground, armature and left contact of relay 130, conductor 144, front contact and third upper armature of relay MP2, back contact and second upper armature of relay MN2, front contact and innermost upper armature of relay TP2, conductor 162, outermost lower armature and back contact of relay RP2, back contact and outermost lower armature of relay RN2, front contact and second lower armature of relay 134, conductor 149, contacts 227 of relay 210, conductor 228, lower winding of relay 213, to battery and ground. Relay 213 of the second group of register relays operates in this circuit.

A second circuit also results from the operation of code relays MP and TP and the consequent operation of translator relays MP2 and TP2. This circuit traverses the same circuit traced in the preceding paragraph up to the point 170 where it branches off to include the second lower armature and back contact of relay RN2, front contact and second upper armature of relay 134, conductor 148, inner upper armature and front contact of relay 210, conductor 241, lower winding of relay 214 to battery and ground. Relay 214 operates in this circuit.

At their lower armatures, register relays 213 and 214 establish obvious circuits for lamp signals at 229. Relays 213 and 214 lock in the same manner as did relay 204, previously described, and in the locking circuit thereof, relay 211 operates to cause relay 220 to operate, and to release relay 210. Relay 220 operated, connects the leads 146 to 151, inclusive to the windings of relays 222 to 226 of the third group of register relays, whose function it is to register and store the digit "4" of the telephone designation AD4–5678.

The equipment which functioned as a consequence of the operation of key k at substation A restores when the key k is released, in a manner similar to that described after the registration of the designation character "A" by the register relay 204. The telephone designation characters "A" and "D" are now stored in the decoder register and the equipment is prepared to register the digit "4" in response to the actuation of key g at the substation A.

When key g is actuated in accordance with the third digit "4" of the desired telephone designation, the positive poled rectifiers 1 and 3 are connected between the tip and ground and between the ring and ground respectively, and code relays TP and RP in the delta network respond to effect the operation of translator relays TP2 and RP2 which, in turn cause register relay 225 to operate and store the digit "4" in the decoder register. It is believed unnecessary to describe in detail the operation of the circuits in response to the actuation of key g at the station A, since such operation is now apparent from the description of the registration of the first two characters of the designation.

The decoder register circuit shows in detail only those groups of register relays which function to store the first three and the last characters of a telephone designation, it being understood that at least three and possibly five similar groups of register relays are interposed between the third and last groups illustrated. The broken lines to the left in Fig. 3 indicate the omission of the other groups of register relays of the decoder register. The groups of register relays, not shown, function in the present case, in response to the successive actuations of keys b, d and f to store the designation digits "5", "6" and "7".

Key m at the subscriber's station A is actuated for the transmission of the last digit, "8", of the required designation, whereupon code relays TN and MN in the delta network operate and cause translator relays TN2 and MN2 to operate. Through the operation of key m, rectifier 2 is connected between ground and the tip conductor of the calling line and rectifier 6 is connected across the tip and ring conductors of the line. Code relays TN and MN in the delta network accordingly operate to cause the operation of translator relays TN2 and MN2. With relays TN2 and MN2 operated, ground is connected to the leads 149, 148 and 150 to cause the operation of decoder register relays 233, 234 and 236. Relay 233 operates in a circuit extending from grounded battery, lower winding of relay 233, conductor 289, contacts 281 of relay 230, conductor 149, second lower armature and front contact of relay 134, outermost lower armature and back contact of relay RN2, back contact and outermost lower armature of RP2, second upper armature and front contact of relay TN2, second upper armatures and back contacts of relays RP2, RN2 and TP2, third upper armature and front contact of relay MN2, outermost upper armature and back contact of relay MP2, conductor 144, left contact and armature of relay 130 to ground. The operating circuit for relay 234 extends from grounded battery, lower winding of relay 234, conductor 283, front contact and inner upper armature of relay 230, conductor 148, second upper armature and front contact of relay 134, back contact and second lower armature of relay RN2, and thence to ground at the armature of relay 130 by way of the circuit just traced, from the outermost lower armature of relay RN2 for the operation of relay 233. Relay 236 operates in a circuit extending from grounded battery, lower winding of relay 236, conductor 284, front contact and second lower armature of relay 230, conductor 150, third lower armature and front contact of relay 134, front contact and innermost upper armature of relay TN2, second upper armature and front contact of relay TN2, second upper armatures and back contacts of relays RP2, RN2 and TP2, third upper armature and front contact of relay MN2, outermost upper armature and back contact of relay MP2 to ground at the armature and left contact of relay 130 by way of conductor 144.

Thus for the last digit "8" of the desired telephone designation, relays 233, 234 and 236 in the decoder register circuit are operated and store this digit. The release of key m at the subscriber's station A restores the equipment to normal in a manner already described in connection with the release of key c.

The table shown in Fig. 6 indicates the code, translator and register relays which operate when each of the keys of the keyboard K at substation A is actuated. It is to be understood that in this table, under the heading "Register relays," there are shown but four digital positions, the first, second, third and last, the intermediate positions being omitted in order that the table might correspond to the showing of the translator circuit, which as hereinbefore indicated, does not include all groups of register relays. It will also be understood that each key operates a different register relay, or group thereof, depending upon which digital position is occupied by the digit or character, corresponding to the particular key. For example, key c causes register relay 204 to operate when the character A, B, C or 2 occupies the first digital position, whereas the actuation of the same key c causes register relay 214 to operate when such character occupies the second digital position of a designation. Similarly relay 224 functions when key c is actuated to transmit the third digit of a designation and relay 234 is actuated when the key c is actuated to transmit the last digit of a designation.

Fig. 4 illustrates an alternative form of translator circuit which employs two fewer relays than the translator circuit of Fig. 1 and which permits a reduced cycle time. As in Fig. 1, the multicontact translator relays of Fig. 4 are designated MP2, MN2, RN2, RP2, TP2 and TN2. The table shown in Fig. 6 applies as well to Fig. 4 as it does to Fig. 1.

As in the case previously described, when the translator circuit is connected to a calling subscriber's line such as the line extending to substation A, the rectified current operates supervisory relay 106 (Fig. 1) which operates off-normal relay 400 over an obvious circuit. Relay 400 operated, connects off-normal ground to the armature of "signal present" relay 402 by way of conductor 401 and operates relay 402 in a circuit extending from grounded battery, upper winding of relay 402, conductor 403, conductor 166, left contact and armature of code relay TN, left contact and armature of code relay TP, conductor 126, to ground by way of the front contact and upper armature of relay 400. Relay 402 operated, establishes an obvious circuit for the energization of "enabler" relay 404 which, in turn, causes the "signal recorded" relay 406 to operate in a circuit extending from grounded battery, lower armature and front contact of relay 400, conductor 405, armature and left contact of relay 404, to ground by way of the lower winding of relay 406. With relays 400, 402, 404 and 406 operated, the translator circuit is prepared to receive the telephone designation digits.

It is believed unnecessary to furnish a detailed description of the transmission of the telephone designation digits in connection with the operation of the translator circuit of Fig. 4, since the description hereinbefore presented covers the operation of the code relays in response to the actuation of the various keys at station A, and these relays function in the same manner when the system involves the translator circuit of Fig. 4. The description which follows will however, be in sufficient detail to provide a complete understanding of the operation of the alternative form of translator circuit.

When any digit of a telephone designation is transmitted, either relay TP or relay TN operates as indicated by the table of Fig. 6. The operation of either of these relays opens the operating circuit for relay 402, causing this relay to release. Relay 402 released, starts the slow-to-release relay 404 to release, connects ground to the armature of operated relay 406, which ground operates timing relay 408 in a circuit extending from grounded battery, upper winding of relay 408, back contacts and middle upper armatures of relays MP2, MN2, RN2 and RP2, back contacts and outer upper armatures of relays TP2 and TN2, conductor 409, left contact and armature of relay 406, left contact and armature of relay 402, conductor 401, to ground at the front contact and upper armature of relay 400. By way of conductor 127, which is an extension of conductor 409, ground is connected to the armatures of code relays RN, RP, MN and MP (Fig. 1).

Since there is no battery voltage connected to any of the multicontact translator relays MP2, MN2, RN2, RP2, TP2 and TN2, at this time, none of these relays operate due to the operation of the code relays in the delta network. When relay 408 operated, it removed ground from the lock and transfer lead 146 extending to the decoder register circuit and applied locking ground to the multicontact translator relays, and to the "battery hold" relay 410, none of which relays are yet operated.

When the maximum transient operation time of the code relays RN, RP, MN and MP has elapsed, the "enabler" relay 404 releases. The four relays RN, RP, MN and MP are the only relays of the delta which are subject to extended transient operation. Relays TP and TN always have operate current and are not subject to transient operation. This starts the relay 406 to release, connects battery to all the multicontact translator relays so that they will operate in accordance with the operated delta code relays. Relay 410 also operates as a consequence of the release of relay 404, and locks in an obvious circuit. Relay 410 maintains battery on the multicontact translator relays even if the "enabler" relay 404 should be reoperated due to a short key closure.

The minimum release time of relay 406 is equal to the maximum operate time of the multicontact translator relays. When this time has elapsed, the ground connection to the armatures of relays RN, RP, MN and MP is removed by relay 406 to prevent false operation of any multicontact translator relay due to an ending transient, and ground is connected to the relay 400 to hold it operated should the supervisory relay 106 release during reception of a digit. This ground is not applied until the expiration of a predetermined time interval after a digit is received, but the minimum release time of relay 400 is considerably in excess of this time. The contact of relay 406 operates the "long closure" relay 412 to disconnect the tip code relays TP and TN from their associated multicontact translator relays TP2 and TN2.

It will now be assumed that the subscriber at station A, in transmitting a particular digit, has held the key actuated for a period of time which constitutes a "long closure."

With a long key closure, relays 402, 404 and 406 remain released. The proper multicontact translator relays will have operated during the release time of relay 406 and are locked operated to the front contact of relay 408. Battery is supplied to the translator relays by both relays 410 and 404.

When the first multicontact translator relay operated, the operate ground to relay 408 was interrupted, since the circuit to relay 408 includes a back contact and an armature of each of the translator relays MP2, MN2, RN2, RP2, TP2 and TN2. The release time of this relay is the minimum register time of the decoder register plus the maximum stagger time of the multicontact translator relays. Consequently, the proper ground closures to leads 147, 148, 149, 150 and 151 to the register will be applied for a sufficient length of time, after which relay 408 will release, and during which time relay 412 operates. The release of the relay 408 immediately applies ground to the lock and transfer lead 146 to the register, and removes the locking ground from the multicontact translator relays, permitting them all to release, even though their corresponding code relays in the delta network are still operated, because relay 406 is released and relay 412 is operated. Relay 410 also releases at this time.

When the key pulse signal ends, either code relay TP or TN, whichever is operated, releases. This reoperates relay 402 causing relay 412 to release. Relay 408 is now held operated by the supervisory relay 106. Relay 402 also operates relay 404 which removes battery from the multicontact translator relays and reoperates relay 406. The digit has now been registered in the decoder register circuit (Fig. 3) and the translator has been restored to its initial condition. The actual registration of the digit in the decoder register circuit has not been described, since such registration by the register relays is now apparent from the description of the transmission and registration of the telephone designation AD4—5678, hereinbefore made.

With a short key closure, the code relays may release just at the instant the relay 406 releases. The end of the key closure reoperates relay 402, then relay 404 and then relay 406, so that relay 412 may or may not operate. In any event, no ground is now connected to the armatures of relays RN, RP, MN and MP and either relay TP2 or TN2 which is operated disables the other. Therefore, no additional multicontact translator relays may be operated falsely. The operation of relay 404 removed one path for battery to the multicontact relays, but because relay 410 has an operate time no greater than any of the latter, they receive battery from relay 410 and remain locked to ground from relay 408. When relay 408 releases to transfer the decoder register, it removes the locking ground from all the multicontact translator relays and relay 410, permitting them to release. The digit has now been registered in the register and the translator circuit has been restored to its initial condition.

It will be noted that each combination of code relays employed in the transmission of the characters of a telephone designation involves either relay TP or relay TN since the translator circuits depend on these relays to start a registration. The keys n and p when operated do not cause the operation of either relays TP or TN so that these keys would not be employed in the transmission of telehpone designations. They are merely shown to illustrate other possible combinations over and above the number required in a designation transmission system.

The twelve varistor combinations yield all the possible code relay combinations but there are other rectifier combinations which will give the same relay operate pattern. For example, the digit "0" may be obtained by rectifier 1 alone or by rectifiers 3 and 5 as well as by rectifiers 1, 3 and 5. The digits 5, 2, 6, 1 and 7 and their corresponding letters may also be characterized by other rectifier combinations, for example, the digit "5" may be characterized by rectifiers 4 and 6 or by rectifiers 2, 4 and 6 as well as by rectifier 2; the digit "2" may be characterized by rectifiers 1 and 6 or by rectifiers 1, 3 and 6 as well as by rectifier 3; the digit "6" may be characterized by rectifiers 2 and 5, by rectifiers 2, 4 and 5 as well as by rectifier 4; the digit "1" may be characterized by rectifiers 1 and 4 or by rectifiers 1, 4 and 5 as well as by rectifier 5; and the digit "7" may be characterized by rectifiers 2 and 3 or by rectifiers 2, 3 and 6 as well as by rectifier 6. Applicant elected to show the simplest key-set arrangement in the drawings, but it is to be understood that the above indicated alternatives for certain of the digits are equally suitable. The digits "4," "9," "3" and "8" as well as those effected by the operation of keys n and p can be obtained only by the combinations indicated on Fig. 11.

It will be understood that, though the system disclosed in the drawings is shown to involve a delta power connection at the central office, other alternative three-phase connections may be used without departing from the spirit or scope of the invention.

Figure 2:
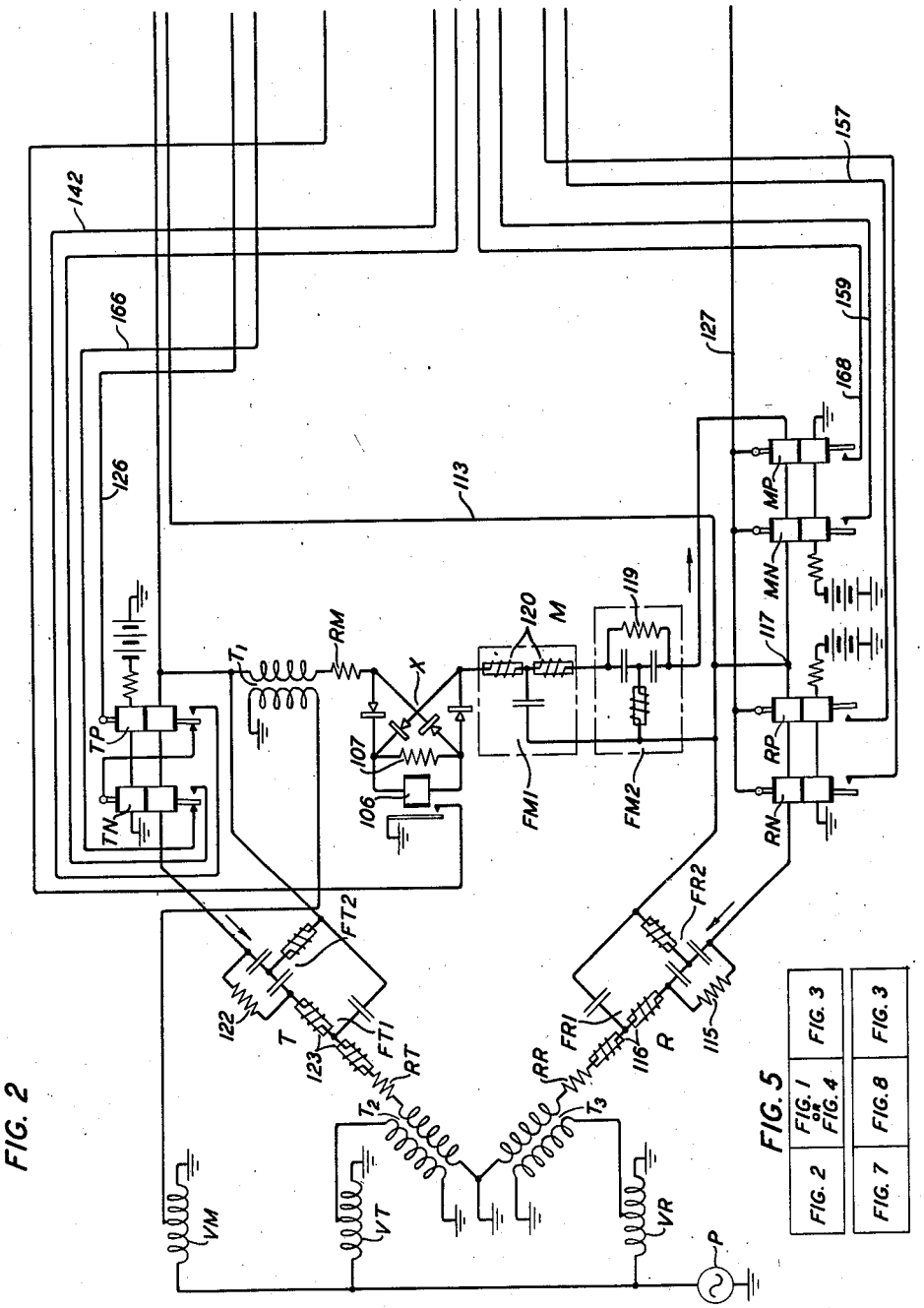
Fig. 2 shows a delta-connected three-phase transformer termination of a cable line L and the equipment thereof which responds directly to the actuation of the key sender at the calling station to control the operation of the translator circuit.
Figure 7:
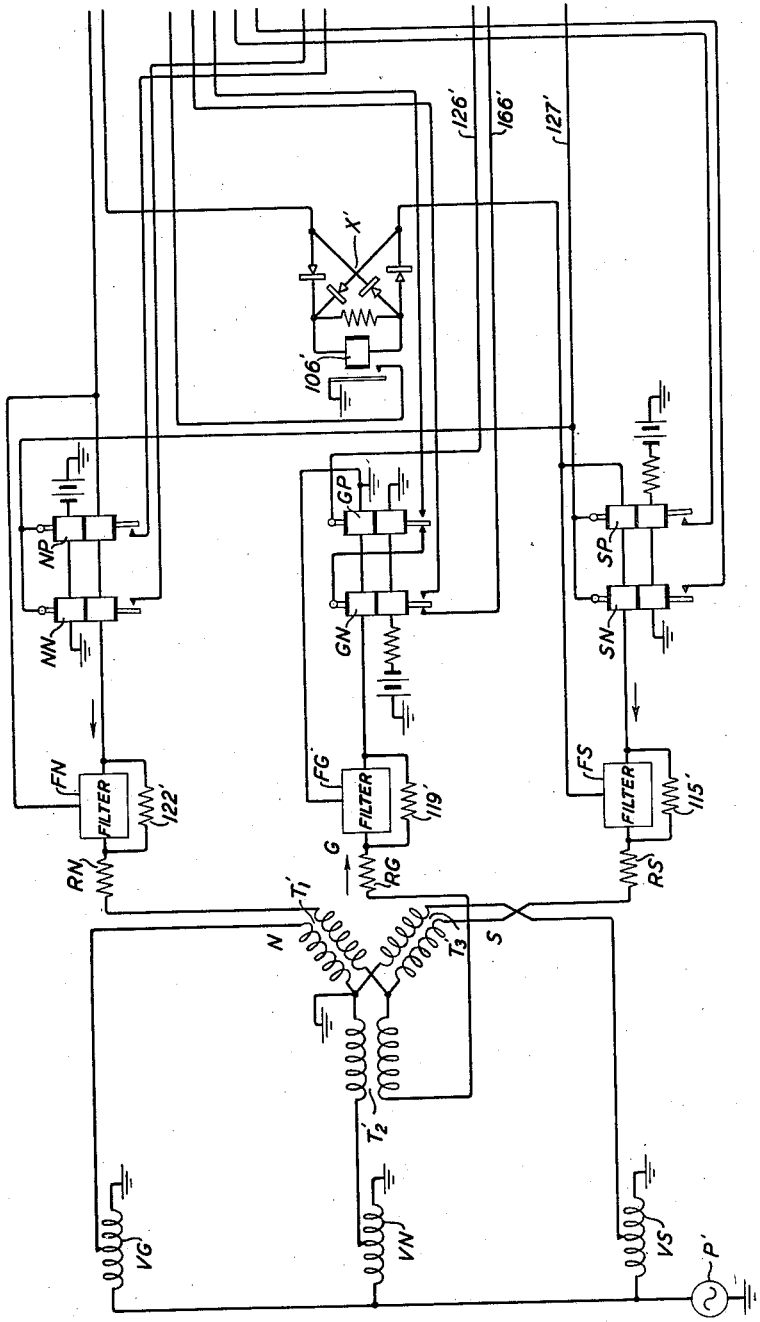
Fig. 7 shows a Y-connected three-phase transformer termination of the cable line L' and the equipment thereof which responds directly to the actuation of the key sender K' (Fig. 8) to control the operation of the translator circuit shown in Fig. 8.
Figure 8:
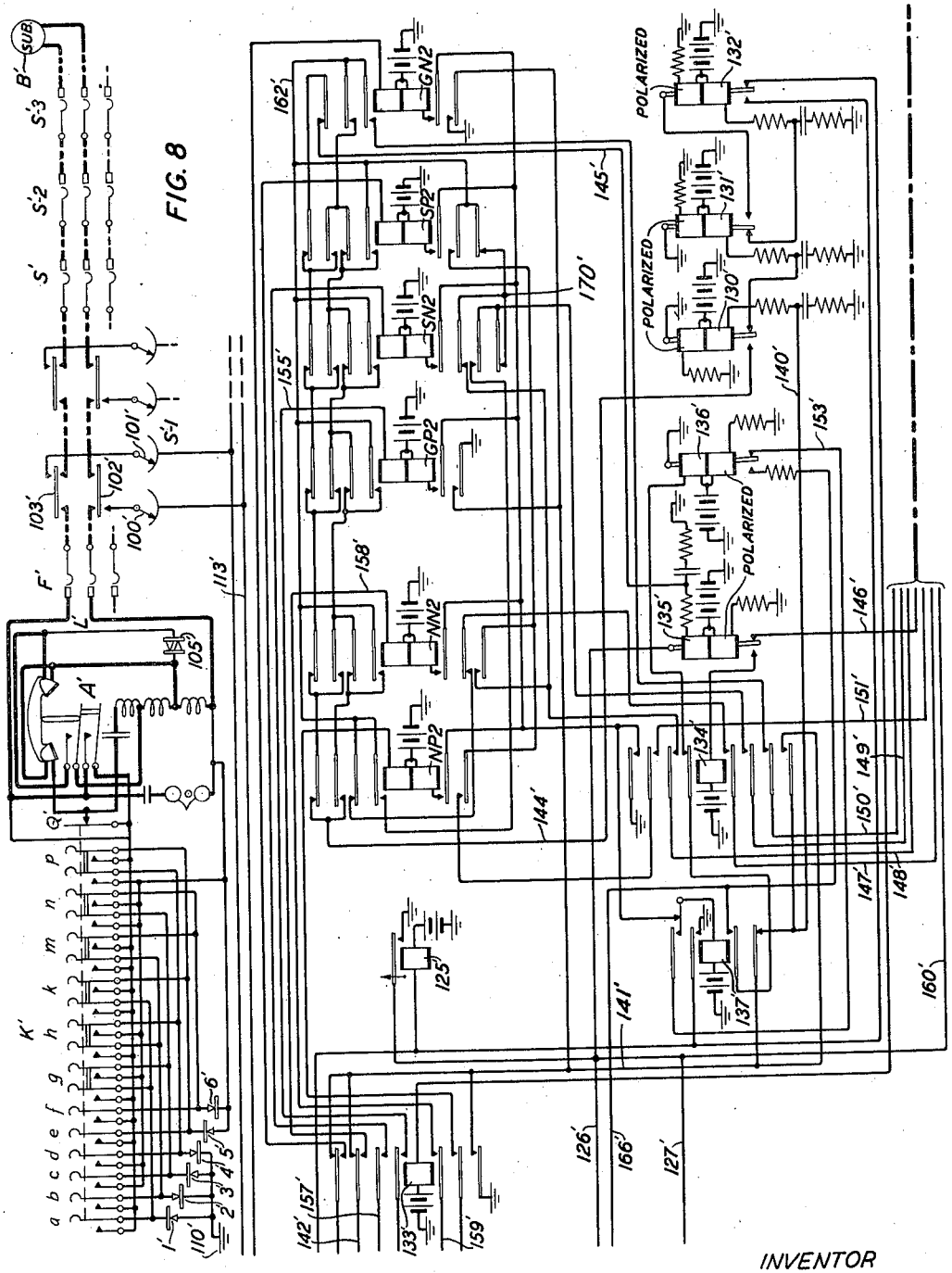
Fig. 8 shows diagrammatically the automatic switches over which a call originated at a calling station A' may be extended to a called station B', and also illustrates the key type sender K' employed at the calling station, and a translator circuit which functions to translate the impulses originated at the calling station A'.

The embodiment of the invention involving a Y-connected termination will now be described and for this purpose reference is made to Figs. 7, 8 and 3 it being understood that Fig. 8 is identical to Fig. 1 except that the translator relays in the former are designated NP2, NN2, GP2, SN2, SP2 and GN2 instead of MP2, MN2, TP2, RN2, RP2 and TN2, respectively, and that Fig. 7 discloses the Y termination of the cable L' instead of the delta termination illustrated in Fig. 2. Fig. 9 corresponds to Fig. 6 and shows in table form the various keys of keyboard K, the telephone designation characters corresponding thereto and the code, translator and register relays which operate when each of the keys is actuated. This table accounts for only ten keys, it being understood that ten keys are sufficient for the transmission of a telephone designation.

Fig. 7 illustrates a two-wire circuit extending from a calling station A' (Fig. 8) and terminating at a central office in a Y-connected termination which comprises the secondary windings of a three-phase Y-connected transformer. The Y network termination comprises three electrically balanced legs N, S and G. The N and G legs are connected in series between the tip conductor of cable L' and ground while the S and G legs are connected in series between the ring conductor of cable L' and ground. Each leg contains two polar relays designated NP and NN, SP and SN, and GP and GN, respectively. Relays NP, SP and GP operate when a direct current component of positive polarity flows through their windings and relays NN, SN and GN operate when a direct current component of negative polarity flows through their windings. The definition of "positive" current in each leg is arbitrary. The directions assumed as positive are indicated in the drawings by arrows. Each branch of the Y termination also includes two elimination filters, one tuned to 60 cycles and the other to 120 cycles to prevent the relay contacts from following these current components. These filters are represented by the blocks FN, FS and FG and are identical to the filters shown in detail in Fig. 2. Each branch of the Y connection also includes a current limiting resistance such as RN, RS and RG.

A source of 60-cycle, three-phase power is indicated at P'. This source is connected to three variacs or adjustable autotransformers VN, VS and VG which are arranged in a Y connection. As in the previously described embodiment, the variacs provide a convenient method of varying the voltage and of correcting for any inequality between the phase voltages. The output leads of the variacs connect to the primary windings of transformers T1, T2 and T3 which have a common grounded terminal. The secondary windings of transformers T'1, T'2 and T'3 are part of the Y termination of the cable L' and supply signaling current direct thereto. The frequency of the source P' obviously need not be restricted to 60 cycles. The Y source of energy is connected to a calling subscriber's line by way of the central office switches when the calling subscriber at a substation, such as station A', initiates a call.

The direct current impulses which selectively operate the code relays NP, NN, SN, SP, GN and GP are produced by the keyboard sender or keying device K' located at the calling substation A'. As in the case of the keyboard at substation A, this device consists of a plurality of individually operable keys a, b, c, d, e, f, g, h, k, m, n and p each of which functions when actuated to connect one or more of the varistors 1', 2', 3', 4', 5', 6' to the tip and/or ring conductors of the subscriber's line or across both line conductors.

It will be observed that the keys of keyboard K are identified in exactly the same manner as are the keys or keyboard K' so that the same varistors 1' to 6', inclusive, are connected in exactly the same manner when similarly designated keys of the latter keyboard are actuated as were connected when the keys of keyboard K were actuated. Varistors 1' to 6', inclusive, are poled in the same manners as are varistors 1 to 6, inclusive, respectively. It is believed therefore unnecessary to repeat, in this description, the varistor connections effected by the actuation of the keys of keyboard K'. This is clearly illustrated in Fig. 10.

It will be further noted, by comparing the tables shown in Figs. 6 and 9, that the keys of the latter do not necessarily correspond to the same telephone designation characters to which similarly identified keys of keyboard K correspond. However, the arrangement is such that when a particular telephone designation character is to be transmitted, the same register relays operate in either case. For example, in the table of Fig. 6, the key e corresponds to the telephone designation character "1" whereas in the table of Fig. 9, key k would be actuated to transmit the character "1." In either case, the same register relays 203, 213, 223 and 233 would operate depending on the digital position occupied by the character "1."

The operation of the system embodied in Figs. 7, 8 and 3 will now be described in detail and it will be assumed, as in the earlier description, that the subscriber at station A' desires a connection with the subscriber's line terminating at station B', the telephone designation of which, for descriptive purposes, will be assumed to be AD4-5678.

When the subscriber at station A' removes the handset, in accordance with usual practice, to initiate a call, the line circuit is closed and the finder F' is started in operation in the well-known manner to seize the calling subscriber's line. At the same time, the sender selector S'—1 becomes effective to extend the calling subscriber's line through to an idle sender. When these operations have been completed, a circuit is closed from the alternating current source P' at the central office through the legs N, S and G of the Y network to the brushes 100' and 101', contact springs 102' and 103' of a controlling sequence switch, thence over the brushes of finder F' to the terminals of which the line of station A' which is line L' is now connected, and through the closed subscriber's line loop at station A'.

The polarized relays NP, NN, SN, SP, GN and GP do not operate on this alternating current because the filters FN, FS and FG eliminate this current from the relays.

When a key of the keyboard K' is operated at the substation A' and one or more of the varistors 1' to 6', inclusive, are connected to the line or cable L', it is necessary that one of the leads to the subset be disconnected so that there be no low resistance path from tip to ring while the signal, or designation character is being passed. This is accomplished by the off-normal switch Q' which opens whenever any key is actuated. Whenever the off-normal switch Q' is closed, the subscriber will hear an audible tone in the receiver due to the alternating current voltage being impressed on the line by the source P'. A varistor 105' is connected across the receiver at station A' to reduce the receiver noise which is caused when the off-normal switch Q' opens and closes.

Supervision is maintained with alternating current between the signaling periods. For this purpose supervisory relay 106' is shown included in the R branch of the wye termination. It functions from a full-wave copper-oxide rectifier X' and has a resistance shunt 107' to keep it steadily operated on the pulsating direct current which it receives.

After removing the handset at station A' from its support, the subscriber proceeds to actuate the keys of keyboard K' in accordance with the desired telephone number. This number has been assumed to be AD4-5678 and, accordingly, the subscriber actuates keys n, a, c, h, p, m and b (See Fig. 9) in that order.

With key n actuated, a circuit is established which extends from ground at 110', positive poled varistor 3', closed left contacts of key n, ring side of the substation line and corresponding terminals and brushes of switches F' and S'—1, conductor 113', full-wave rectifier X' and winding of relay 106', operating windings of polar relays SP and SN, resistance 115', resistance RS, secondary coil of transformer T'3, secondary winding of transformer T'2, resistance RG, resistance 119', operating windings of polar relays GN and GP to ground. The positive current traversing the circuit just traced causes polar relays SP and GP to operate. At the right-hand contacts of key n, negatively poled rectifier 6' is connected across the tip and ring conductors of the cable line L' so that the operating windings of relays NP, NN, SP and SN and their respective transformer secondary windings are bridged by varistor 6'. The current in this circuit is in such a direction as to tend to operate relays SP and NN. It follows, therefore, that with key n actuated to operatively connect varistors 3' and 6' to the line L', polar relays NN, GP and SP operate.

It will be noted that when supervisory relay 106' operated, as described above, an obvious circuit was established for the operation of slow-to-release relay 125' (Fig. 8). Relay 125' places ground on conductors 126' and 127', the former being connected to the armature of relay GP and the latter being connected to the armatures of all relays SP, SN, NP and NN. The multicontact translator relays of Fig. 8 which correspond to the wye code relays NP, NN, SN, SP, GN and GP are NP2, NN2, SN2, SP2, GN2 and GP2, respectively.

Relays 130', 131' and 132' (Fig. 8) correspond to relays 130, 131 and 132 of Fig. 1 and perform the same functions. They constitute a timing circuit which controls the operation and release of relay 133', which functions to momentarily connect the armature contacts of the code relays in the wye network to the translator relays NP2, NN2, GP2, SN2, SP2 and GN2. A slow-to-release relay 135' controls the minimum length of signal delivered to the decoder register relays (Fig. 3) through the contacts of a connector and locking relay 134', while the "end of signal" relay 136' releases a relay 137' whose operation indicates that a signal is being registered. Relay 136' is operated, providing relay 134' is released, when both relays GP and GN are released, indicating that the subscriber is not signaling.

With key n at substation A' operated, and code relays NN, SP and GP in the wye network operated, a circuit for the operation of relay 130' is established extending from grounded battery, lower winding of relay 130', conductor 140', back contact and outer lower armature of relay 137', conductor 141', back contact and third upper armature of relay 133', conductor 142', right contact and armature of relay GP (operated), conductor 126', to ground by way of the armature and front contact of relay 125'. Relay 130' operated, releases the slow-to-release relay 131' and operates relay 135' in a circuit extending from ground, armature and left contact of relay 130', conductor 144', back contacts and outermost upper armatures of relays NP2, NN2, GP2, SN2, SP2 and GN2, conductor 145', upper winding of relay 135' to grounded battery.

Relay 135' operated, removes ground from the transfer lead 146' to the decoder register circuit and operates relay 134' in an obvious circuit. Relay 134' operated, connects the leads 147', 148', 149', 150' and 151' of the decoder register circuit to the unoperated multicontact translator relays NP2, NN2, GP2, SN2, SP2 and GN2. At its outermost lower armature and front contact, relay 134' provides another operating circuit for relay 130' and at its outermost upper armature and front contact, establishes an obvious circuit for relay 137'. Relay 137' operates in this circuit and locks to ground at the armature of "end of signal" relay 136' by way of the conductor 153'. Relay 134', at its outermost upper armature and front contact also connects ground to the locking contact of each of the translator relays NP2, NN2, GP2, SN2, SP2 and GN2.

While these functions are being performed, slow-to-release relay 131' has not yet released. Furthermore, at the end of any initial transient operation of the code relays in the wye network there may have been a short interval until the proper code relays operated which would remove the operating ground for relay 130'. Relay 130' is accordingly made slightly slow to release to bridge any gap of this sort and not interrupt the release time of relay 131' or interfere with the operations of relays 135', 134' and 137'.

When relay 131' finally drops, it releases the slow-to-release relay 132' and operates relay 133' in an obvious circuit. The operation of relay 133' connects the front contacts of each of the code relays in the wye network to the associated windings of the multicontact translator relays NP2, NN2, GP2, SN2, SP2 and GN2 and also, at its outermost lower armature and front contact replaces a ground on conductor 141' to hold relay 130' operated, which ground had been removed when relay 133' operated its third upper armature.

As previously described code relays GP, SP and NN in the wye network are operated, so that circuits are now established by the operation of relay 133', in which corresponding multicontact translator relays operate.

Translator relay GP2, operates in a circuit extending from grounded battery, upper winding of relay GP2, conductor 155', front contact and third upper armature of relay 133', conductor 142', right contact and armature of relay GP, conductor 126' to ground by way of the armature and front contact of relay 125'.

Translator relay SP2 operates in a circuit extending from grounded battery, upper winding of relay SP2, front contact and second upper armature of relay 133', conductor 157', contact and armature of relay SP, conductor 127' to ground by way of the armature and front contact of relay 125'.

Translator relay NN2 operates in a circuit extending from grounded battery, upper winding of relay NN2, conductor 158', front contact and first lower armature of relay 133', conductor 159', contact and armature of relay NN, conductor 127' to ground by way of the armature and front contact of relay 125'.

Relays GP2, SP2 and NN2 operated, lock to ground at the outermost upper armature and front contact of relay 134'. These relays also open the operating path of slow-release relay 135'. In addition, ground is connected to lead 148' extending to the decoder register circuit (Fig. 3) to operate register relay 204 as will now be described in detail. It will be noted that when relay 125' operated, ground was connected to lead 160' which extends to the decoder register circuit, so that relay 200 is operated in a circuit extending from grounded battery, winding of relay 200, back contact and lower armature of relay 201, conductors 202' and 160' to ground at the armature and contact of relay 125'. Relay 200 is operated and connects the leads 147' to 151', inclusive, to the windings of relays 202, 203, 204, 205 and 206, which constitute the first group of register relays.

With translator relays NN2, SP2 and GP2 and relay 200 in the decoder register circuit operated, a circuit is established for the operation of register relay 204. This circuit may be traced from grounded battery, lower winding of register relay 204, conductor 207, front contact and inner upper armature of relay 200, conductors 148 and 148', second upper armature and front contact of relay 134', front contact and outermost lower armature of relay NN2, front contact and middle lower armature of relay SP2, lowermost upper armature and front contact of relay GP2, third upper armature and front contact of relay NN2, outermost upper armature and back contact of relay NP2, conductor 144', left contact and armature of relay 130' to ground. Relay 204 operates in this circuit and locks, as described in connection with the first embodiment of the invention, and completes an obvious circuit for the energization of lamp signal at 217. Thus the character "A" of the telephone designation AD4–5678 is stored in the register for future use in controlling the automatic switches S', S'—2 and S'—3 which function to extend the call to the called station B'.

As in the first described embodiment, the release time of relay 135' is made to equal the minimum closure time for grounds applied to the leads 147' to 151', inclusive, plus the maximum difference between the operate times of the translator relays. When relay 135' releases, it places ground on "lock and transfer" lead 146' to lock relay 204 operated as previously described. It also releases relay 134' which disconnects the contacts of multicontact translator relays NP2, NN2, GP2, SN2, SP2 and GN2 from the decoder register and releases relay 130'.

The release of relay 130' immediately reoperates relay 131', which, in turn, operates relay 132'. The release of relay 134' further partially closes the operate path for the "end of signal" relay 136', so when relays 134', GP or GN (GP in the present case) release indicating that the subscriber has released the key $n$, and the digit character "A" is registered in the sender, relay 136' operates. The operating circuit for relay 136' extends from grounded battery, upper winding of relay 136', back contact and innermost upper armature of relay 134', inner lower armature and front contact of relay 137', conductor 166', left contact and armature of relay GN, left contact and armature of relay GP (released), conductor 126', to ground at the armature and front contact of slow-to-release relay 125'. With relay 136' operated, the locking circuit for relay 137' is opened and relay 137' releases, causing relay 136' to release.

When relay 137' has been released by relay 136' as just described, relay 130' is returned to the control of code relays GP and GN and it will reoperate when either of them operates for the next character of the designation.

When relay 204 in the decoder sender operated as described hereinbefore, its locking circuit was traced through the winding of relay 201, so that relay 201 operated and locked to ground at the armature and contact of relay 125' by way of conductors 160', 202' and the first upper armature and front contact of relay 201. The ground is also transmitted to relay 210, which operates to connect the leads 147' to 151', inclusive, to the second group of register relays 212, 213, 214, 215 and 216. At its lower armature relay 201 opens the circuit of relay 200 which relay releases its armatures.

The translator circuit has now been restored to its initial condition and the character "A" has been registered in the decoder register circuit, and the register has been prepared for the reception of the next designation character "D."

The subscriber at station A' then actuates keys $a$, $c$, $h$, $p$, $m$ and $b$ in the order named. It is believed unnecessary to describe in detail the results of these key operations since Fig. 10 clearly illustrates which code relays of the Y termination respond to the operation of each key of the keyboard sender K' and which varistors 1' to 6' are connected in circuit, and the manner in which they are associated with the conductors of the cable L'. This figure taken with the table shown in Fig. 9, affords a complete picture of the relay operations which occur in response to the operation of the various keyboard keys.

It will be noted that each combination of code relays employed in the transmission of the digits of a telephone designation involves either relay GP or GN since the translator circuits depend on these relays to start a registration. The keys $e$ and $f$ when operated, do not cause the operation of either relays GP or GN so that these keys would not be employed in the transmission of telephone designations. They are shown merely to illustrate other possible combinations over and above the number required in a telephone designation transmission system.

What is claimed is:

1. The combination in a telephone signaling system, of a control station, a receiving station, a signal transmission channel interconnecting said stations and including two wires and a ground connection, a source of three-phase alternating current at the receiving station, means at the control station for converting the alternating current from said source into positive and negative direct current impulses and for selectively applying the impulses to one or the other, or simultaneously to both of the wires of said channel, receiving means for the impulses comprising a three-phase connected network terminating said channel at the receiving station, and means included in each branch of the three-phase termination selectively responsive to the impulses applied to said channel.

2. The combination in a telephone signaling system, of a control station, a receiving station, a signal transmission channel interconnecting said stations and including two wires and a ground connection, a source of three-phase alternating current at the receiving station, means comprising a three-phase connected network for coupling said source to said channel, means at the control station for converting the alternating current from said source into positive and negative direct current impulses and for applying the impulses selectively to either or both of the wires of said channel, and means selectively responsive to the impulses applied to said channel comprising a pair of oppositely poled direct current relays included in each branch of the three-phase connected network.

3. In a signaling system, a control point, a receiving point, a two-wire circuit having a ground connection interconnecting said points and terminating at the receiving point in a network comprising the three secondary windings of a three-phase transformer, a source of alternating current for supplying alternating current to the primary windings of said transformer, a pair of oppositely poled polarized relays included in each branch of the terminating network, and means at said control point for converting the current from said source into positive and negative direct current impulses and for selectively transmitting the impulses over said two-wire circuit singly and in combinations to selectively operate said polarized relays.

4. In a system of code signaling in which the codes are made up of various combinations of positive and/or negative direct current impulses and in which said impulses are transmitted from one point to another over a two-wire circuit having a ground connection, a source of alternating current, means for connecting said source to said circuit, means for converting current from said source into positive and negative current impulses, means for selectively transmitting the impulses over a plurality of circuits comprising one of said circuit wires and ground, another of said circuit wires and ground and a metallic circuit comprising both said circuit wires, and means for receiving the transmitted impulses comprising three pairs of differently poled polarized relays, each pair being included in a separate one of the plurality of circuits.

5. In a signaling system, a control point, a receiving point, a grounded line including a pair of conductors interconnecting said points, said line terminating at the receiving point in a delta network comprising the three secondary windings of a transformer, a source of alternating current for supplying current to the primary windings of said transformer, a pair of oppositely poled polarized relays included in each branch of the delta termination of said line, and means at said control point for converting the current from said source into positive and negative direct current impulses and for selectively transmitting the impulses over said line singly or in combinations to selectively operate said polarized relays.

6. In a signaling system, a control point, a receiving point, a grounded circuit including a pair of conductors interconnecting said points, said circuit terminating in a delta network comprising the three secondary windings of a three-phase transformer, a source of three-phase alternating current at the receiving point for supplying current to the primary windings of said transformer, pair of oppositely poled polarized relays included in each branch of the delta termination of said line, and means at said control point for converting the current from said source into positive and negative direct current impulses and for selectively applying the impulses singly or in combinations to either or both of the conductors of said line to selectively operate said polarized relays in various combinations.

7. In a selective signaling system, a two-wire circuit terminating in a delta network having a ground connection, a source of alternating current for supplying current to the delta termination of said line, means for converting the alternating current into positive and negative direct current impulses, means for selectively applying the direct current impulses to said line to cause them to traverse one of the branches of the delta network to ground and the other two branches in series to ground, and a pair of polarized relays selectively responsive to positive and negative direct current impulses included in each branch of the line terminating delta network.

8. In a selective signaling system, a two-wire circuit terminating in a delta network comprising a branch connected across the wires of said circuit and a branch connected between each wire of the circuit and ground, a pair of oppositely poled polarized relays included in each branch, a source of alternating current for supplying current to the delta termination of said line, means for converting the alternating current into positive and negative direct current impulses, means for applying an impulse of one or the other polarities between ground and one of the wires of said circuit to cause the impulse to traverse one of the branches to ground and the other two branches in series to ground whereby one of each of said pairs of relays are operated.

9. In a signaling system, a two-wire circuit terminating in a delta network having one branch connected across the wires of said circuit and a branch connected between each wire and ground, sources of positive and negative direct current impulses, means for connecting said sources, in various combinations, across said line and between each wire of said line and ground, and means selectively responsive to positive and negative direct current impulses included in each branch of the circuit termination.

10. In a selective signaling system, a two-wire circuit terminating in a delta network comprising a branch connected across the wires of said circuit, a branch connected between ground and one wire and a branch connected between ground and the other wire, means for transmitting various combinations of positive and negative direct current impulses over either of the wires to ground and over the two wires in series so as to traverse the three branches of the circuit termination, and means comprising a pair of polarized relays included in each branch of the circuit termination and selectively responsive to the positive and negative impulses transmitted over the circuit.

11. In a selective signaling system, a two-wire circuit terminating in a delta network comprising a branch connected across the wires of said circuit and a branch connected between each wire of said circuit and ground, a pair of oppositely poled polarized relays included in each branch, a source of alternating current for supplying current to the delta termination of said circuit, a single wave rectifier, and means for connecting said rectifier between either one of the wires of said line and ground to cause rectified current of a particular polarity to traverse the three branches of said delta to ground whereby a relay of each of said pairs of relays is operated.

12. In a signaling system, a control point, a receiving point, a circuit interconnecting said points and comprising a pair of metallic conductors, a termination for said circuit at said receiving point comprising three branch circuits, one connected between the two metallic conductors of said circuit, another connected between ground and one of the metallic conductors of said circuit, and a third connected between ground and the other metallic conductor of said circuit, a source of alternating current at said receiving point for supplying said three branches with current, a pair of oppositely poled polarized relays included in each of the branches of the line termination, a plurality of unidirectional current conducting devices at said control point, and means at said control point for connecting said unidirectional current conducting devices in various combinations between ground and each of said metallic conductors and also across said pair of metallic conductors, whereby the current from said source is converted into positive and/or negative direct current impulses and, as such, caused to flow in the said three branches of the line termination to cause the selective operation of said polarized relays in various combinations.

13. In a telephone designation transmitting system, a calling station, a central office, a line interconnecting said station and said office, and terminating at the central office in a delta network, a supervisory relay included in one of the branches of said network, a translator circuit, means effective upon the initiation of a call at said station for causing the operation of said supervisory relay, means responsive to the operation of said supervisory relay for conditioning said translator circuit for the reception of code signals transmitted from said station, means at said calling station for converting current from said source into positive and negative direct current impulses and causing them to be transmitted over said line in various combinations to characterize the digits of a telephone designation, and means at said central office for controlling the operation of said translator circuit in accordance with the positive and negative impulse combinations transmitted over said line, said means comprising a pair of oppositely poled polarized relays included in each branch of the delta termination of said line.

14. In a system for transmitting telephone designations, a register for storing the designations, a translator circuit comprising a plurality of multicontact relays for controlling said register, timing means included in said translator circuit, a circuit interconnecting a subscriber's station and a central office and terminating in a delta network, each of whose branches includes a pair of oppositely poled polarized code relays, means responsive to the initiation of a call at the subscriber's station for preparing the translator circuit and register for operation and for grounding the armature of each of said code relays, a designation sender at said subscriber's station for operating said code relays in various combinations characterizing the digits of a telephone designation, means controlled by certain of said code relays for causing said timing circuit to function, means controlled by said timing circuit at the commencement of its operation for connecting the armature contacts of said translator relays to the register, and relay means controlled by said timing circuit at the end of its cycle of operation for connecting the contacts of the operated code relays to the windings of said translator relays whereby a combination of translator relays corresponding to the combination of operated code relays is operated a predetermined interval of time after the operation of the code relays, to control the operation of said register.

15. In a system for transmitting telephone designations, a register for storing the designations, a translator circuit comprising a plurality of multicontact relays for controlling said register, timing means included in said translator circuit, a circuit interconnecting a subscriber's station and a central office and terminating in a delta network, each of whose branches includes a pair of oppositely poled polarized code relays, means responsive to the initiation of a call at the subscriber's station for preparing the translator circuit and register for operation and for grounding the armature of each of said code relays, a designation sender at said subscriber's station for operating said code relays in various combinations characterizing the digits of a telephone designation, means controlled by certain of said code relays for causing said timing circuit to function, means controlled by said timing circuit at the commencement of its operation for connecting the armature contacts of said translator relays to the register, and relay means controlled by said timing circuit at the end of its cycle of operation for connecting the contacts of the operated code relays to the windings of said translator relays whereby a combination of translator relays corresponding to the combination of operated code relays is operated a predetermined interval of time after the operation of the code relays, to control the operation of said register, and means controlled by the operated translator relays for releasing said relay means, whereby the contacts of the operated code relays are disassociated from the windings of the translator relays.

16. In a system for transmitting telephone designations, a register for storing the designations, a translator circuit comprising a plurality of multicontact relays for controlling said register, timing means included in said translator circuit, a circuit interconnecting a subscriber's station and a central office and terminating in a delta network, each of whose branches includes a pair of oppositely poled polarized code relays, means responsive to the initiation of a call at the subscriber's station for preparing the translator circuit and register for operation and for grounding the armature of each of said code relays, a designation sender at said subscriber's station for operating said code relays in various combinations characterizing the digits of a telephone designation, means controlled by certain of said code relays for causing said timing circuit to function, means controlled by said timing circuit at the commencement of its operation for connecting the armature contacts of said translator relays to the register, and relay means controlled by said timing circuit at the end of its cycle of operation for connecting the contacts of the operated code relays to the windings of said translator relays, whereby a combination of translator relays corresponding to the combination of operated code relays is operated a predetermined interval of time after the operation of the code relays, to control the operation of said register, and means controlled by the operated translator relays for releasing said relay means, whereby the contacts of the operated code relays are disassociated from the windings of the translator relays, and slow releasing means also controlled by the operated translator relays for disconnecting the armature contacts of said translator relays from said register and for releasing the operated translator relays.

17. In a system for transmitting telephone designations by means of a key type sender in which the closure of a key effects the transmission of an impulse which characterizes the digit of a telephone designation, a circuit over which the impulse is transmitted and which terminates in a delta network, each branch of which comprises a pair of code relays and certain of which relays respond in a particular combination in response to the transmitted impulse, a register for registering the designation digit characterized by the impulse, a translator circuit controlling said register and comprising translator relays equal in number to the number of code relays, means controlled by the operation of said code relays in response to the transmitted impulse for preparing an operating circuit for each of the translator relays corresponding to the operated code relays, timing means controlled by the operation of certain of said code relays for completing the operating circuits to the translator relays a predetermined period of time after the operation of the code relays, whereby a number of translator relays corresponding to the operated code relays operate, a locking circuit for the operated translator relays, and time delay means controlled by the operated translator relays for opening the locking circuit for said translator relays whereby said translator relays release a predetermined interval of time after their operation irrespective of whether or not the impulse transmitting key is held actuated.

18. In a telephone designation transmitting system, a control point, a receiving point, a line interconnecting said points and terminating in a delta network each of whose branches includes a pair of code relays, a translator circuit comprising translator relays equal in number to the number of code relays, timing means at said receiving point, an operating circuit for each of said translator relays controlled jointly by said timing means and a corresponding one of said code relays, a key at said control point, means controlled by said key when actuated for transmitting a telephone designation digit characterizing impulse over said line to operate said code relays in a particular combination and to initiate the operation of said timing means, whereby the operating circuits to a corresponding number of translator relays are completed a predetermined period of time after the operation of the code relays, a slow releasing relay, means controlled by said timing circuit for operating said slow releasing relay to complete a locking circuit for the operated translator relays, and means independent of said code relays and controlled by said translator relays for releasing said slow releasing relay, whereby said translator relays are held operated for only a predetermined interval of time regardless of the length of time said code relays are held operated by the actuation of said key.

19. In a telephone designation transmitting system, a station, a central office, a circuit interconnecting said station and said central office, said circuit terminating at the central office in a delta-connected network, each branch of said termination including a pair of oppositely poled polarized relays, a register at the central office for recording and registering telephone designations transmitted over said line from said station, a translator circuit for controlling the operation of said register and including a plurality of multi-contact relays which operate in various combinations to characterize the various digits of a telephone designation under control of said polarized relays, a source of alternating current at the central office, means comprising a supervisory relay in one of the branches of the delta termination of said line responsive to the initiation of a call at said station, means controlled by said supervisory relay for conditioning said register for the reception of the designation transmitted over said line and for applying ground to the armature of each of said polarized relays, a plurality of leads extending from the contacts of said polarized relays to the translator circuit, a designation sender at said station comprising means for converting the alternating current from said source into positive and negative direct current impulses and for selectively applying said impulses in various combinations to said line to cause said polarized relays to operate in various combinations, whereby the ground associated with the armatures thereof is extended to the leads extending to said translator circuit, a relay for connecting said leads to the windings of said multicontact translator relays, slow releasing means controlled by certain of said polarized relays for momentarily operating said lead-connecting relay, whereby the grounded leads from the contacts of all said polarized relays are connected to the windings of said multicontact translator relays to cause the operation thereof in combinations corresponding to the operated polarized relays, a plurality of leads extending from the contacts of said multicontact translator relays to said register, and means controlled by said multicontact translator relays for applying ground to the last-mentioned leads in accordance with the combination of translator relays operated, whereby said register is operated in accordance with the combination of polarized relays operated in response to the actuation of the designation sender at said station, said timing means operating to delay the connection of said first-mentioned leads to said translator for a predetermined interval of time after the actuation of said designation sender and to immediately disconnect them therefrom.

20. In a telephone system, a calling station, a called station, automatic switches at a central office for completing a connection between said stations, means for controlling the operation of said switches in accordance with code signals characterizing the characters of the telephone designation of said called station, and means for operating said control means comprising, a two-wire signaling channel terminating at the central office in a network including the secondary windings of a three-phase transformer, a source of three-phase alternating current connected to the primary windings of the three-phase transformer, means responsive to the initiation of a call at the calling station for completing a connection between said calling station and said signaling channel whereupon current from said source traverses said signaling channel, means at said calling station for converting the current from said source into positive and negative direct current impulses and for applying the impulses selectively to either or both of the wires of said channel in combinations characterizing the digits of the telephone designation of the called station, and means comprising a pair of oppositely poled polarized relays connected in series with each of the secondary windings of the three-phase transformer selectively responsive to the impulses applied to said channel at said calling station.

21. In a signaling system, a control point, a receiving point, a line including a pair of conductors interconnecting said points, said line terminating at the receiving point in a wye network comprising the three secondary windings of a transformer, a source of alternating current for supplying current to the primary windings of said transformer, a pair of oppositely poled polarized relays included in each branch of the wye termination of said line, and means at said control point for converting the current from said source into positive and negative direct current impulses and for selectively transmitting the impulses over said line singly or in combinations to selectively operate said polarized relays.

MASON A. LOGAN.